United States Patent
Seok (10) Patent No.: US 9,578,656 B2
(45) Date of Patent: *Feb. 21, 2017

(54) METHOD FOR GRANTING A TRANSMISSION OPPORTUNITY IN A WIRELESS LAN SYSTEM THAT USES A COMBINED CHANNEL CONSTITUTED BY A PLURALITY OF SUBCHANNELS, AND STATION SUPPORTING THE METHOD

(71) Applicant: LG ELECTRONICS INC., Seoul (KR)

(72) Inventor: Yong Ho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/728,853

(22) Filed: Jun. 2, 2015

(65) Prior Publication Data

US 2015/0296541 A1 Oct. 15, 2015

Related U.S. Application Data

(63) Continuation of application No. 14/109,784, filed on Dec. 17, 2013, now Pat. No. 9,084,266, which is a continuation of application No. 13/203,712, filed as application No. PCT/KR2010/001498 on Mar. 10, 2010, now Pat. No. 8,638,772.

(60) Provisional application No. 61/158,745, filed on Mar. 10, 2009.

(51) Int. Cl.
*H04W 4/00* (2009.01)
*H04W 74/06* (2009.01)
*H04W 72/04* (2009.01)
*H04W 84/12* (2009.01)

(52) U.S. Cl.
CPC ......... *H04W 74/06* (2013.01); *H04W 72/0446* (2013.01); *H04W 84/12* (2013.01)

(58) Field of Classification Search
CPC ... H04W 74/06; H04W 72/0446; H04W 84/12
See application file for complete search history.

(56) References Cited

U.S. PATENT DOCUMENTS

| 5,850,400 | A | 12/1998 | Eames et al. |
| 7,123,627 | B2 | 10/2006 | Kowalski |
| 7,418,004 | B2 | 8/2008 | Chou |
| 7,940,687 | B2 | 5/2011 | Sampath |

(Continued)

FOREIGN PATENT DOCUMENTS

EP WO 2004/054284 * 6/2004

OTHER PUBLICATIONS

Skordoulis et al., "IEEE 802.11 N MAC Frame Aggregation Mechanisms for Next-Generation High-Throughput WLANs," IEEE Wireless Communications, pp. 40-47, Feb. 2008.

(Continued)

*Primary Examiner* — Robert Wilson
(74) *Attorney, Agent, or Firm* — Lee, Hong, Degerman, Kang & Waimey PC (57) ABSTRACT

According to one embodiment, a method for granting a transmission opportunity in a wireless local area network includes: transmitting a transmission opportunity (TXOP) granting frame to grant a TXOP to a plurality of target stations; and receiving a frame from each of the plurality of target stations that has acquired the TXOP upon receiving the TXOP granting frame.

3 Claims, 7 Drawing Sheets

(56) References Cited

U.S. PATENT DOCUMENTS

| | | | |
|---|---|---|---|
| 8,638,772 B2 | 1/2014 | Seok | |
| 9,084,266 B2* | 7/2015 | Seok | H04W 74/06 |
| 2003/0091066 A1 | 5/2003 | Choi et al. | |
| 2003/0185241 A1 | 10/2003 | Lu et al. | |
| 2004/0063438 A1* | 4/2004 | Hsu | H01Q 21/065 455/452.1 |
| 2005/0025167 A1 | 2/2005 | Ishibashi et al. | |
| 2005/0135284 A1 | 6/2005 | Nanda et al. | |
| 2007/0058605 A1 | 3/2007 | Meylan et al. | |
| 2008/0025342 A1 | 1/2008 | Kim et al. | |
| 2008/0171552 A1 | 7/2008 | Hyon et al. | |
| 2011/0110351 A1 | 5/2011 | Seok | |
| 2011/0188429 A1* | 8/2011 | Seok | H04W 76/023 370/311 |
| 2011/0310834 A1* | 12/2011 | Seok | H04W 72/0446 370/329 |
| 2013/0242916 A1 | 9/2013 | Meylan et al. | |
| 2014/0105201 A1 | 4/2014 | Seok | |
| 2015/0296541 A1* | 10/2015 | Seok | H04W 72/0446 370/338 |

OTHER PUBLICATIONS

Orfanos et al., "A Centralized MAC Protocol With QOS Support for Wireless LANs," The 18th Annual IEEE International Symposium on Personal, Indoor and Mobile Radio Communications (PIMRC'07), Sep. 2007, pp. 1-5.

Tinnirello et al., "Efficiency Analysis of Burst Transmissions with Block ACK in Contention-Based 802.11e WLANs," IEEE 2005 ICC, pp. 3455-3460, May 2005.

Fallah et al., "Hybrid OFDMA/CSMA Based Medium Access Control for Next-Generation Wireless LANs," ICC 2008 proceedings, pp. 2762-2768, May 2008.

* cited by examiner

Multichannel Polling frame format

FIG. 6

Multichannel Polling IE format

FIG. 7

METHOD FOR GRANTING A TRANSMISSION OPPORTUNITY IN A WIRELESS LAN SYSTEM THAT USES A COMBINED CHANNEL CONSTITUTED BY A PLURALITY OF SUBCHANNELS, AND STATION SUPPORTING THE METHOD

CROSS-REFERENCE TO RELATED APPLICATIONS

This application is a continuation of U.S. application Ser. No. 14/109,784, filed Dec. 17, 2013, now U.S. Pat. No. 9,084,266, which is a continuation of U.S. application Ser. No. 13/203,712, filed Aug. 26, 2011, now U.S. Pat. No. 8,638,772, which is the National Stage filing under 35 U.S.C. 371 of International Application No. PCT/KR2010/001498, filed on Mar. 10, 2010, which claims the benefit of U.S. Provisional Application No. 61/158,745, filed on Mar. 10, 2009, the contents of all of which are incorporated by reference herein in their entireties.

TECHNICAL FIELD

The present invention relates to wireless communication and, more particularly, to a method for granting a transmission opportunity in wireless LAN system that uses a combined channel comprised of a plurality of subchannels and a station supporting the same.

BACKGROUND ART

Recently, diverse wireless communication technologies are under development in line with the advancement of information communication technology. Among them, a wireless local area network (WLAN) is a technique allowing mobile terminals such as personal digital assistants (PDAs), lap top computers, portable multimedia players (PMPs), and the like, to wirelessly access the Internet at homes, in offices, or in a particular service providing area, based on a radio frequency technology.

Since IEEE (Institute of Electrical and Electronics Engineers) 802, a standardization organization of a WLAN technique, was established in February 1980, a great deal of standardization works have been conducted. The early WLAN technique supported the rate of 1~2 Mbps through frequency hopping, spread spectrum, infrared communications, and the like, by using a 2.4 GHz frequency based on IEEE 802.11, and recently, a maximum rate of 54 Mbps can be supported by employing orthogonal frequency division multiplex (OFDM) technology to the WLAN. Further, IEEE 802.11 are putting standards of various techniques, such as improvement of quality of service (QoS), allowing for compatibility of access point (AP) protocols, achievement of security enhancement, measurement radio resource measurement, wireless access vehicular environment, ensuring fast roaming, establishing a mesh network, interworking with an external network, wireless network management, and the like, into practical use or are still developing them.

Among the IEEE 802.11, IEEE 802.11b supports a maximum of 11 Mbs communication speed by using the frequency band of 2.4 GHz. IEEE 802.11a, which has been commercialized following the IEEE 802.11b, uses the frequency band of 5 GHz, rather than 2.4 GHz, to reduce the influence of interference compared with the considerably congested frequency band of 2.4 GHz, and has a communication speed increased up to a maximum 54 Mbps by using the OFDM technique. However, IEEE 802.11a has shortcomings in that its communication distance is shorter than that of IEEE 802.11b. Meanwhile, IEEE 802.11g uses the frequency band of 2.4 GHz, like IEEE 802.11b does, to implement a communication speed of a maximum 54 Mbps and satisfies backward compatibility, and as such, IEEE 802.11g has come into prominence. Also, IEEE 802.11b is superior to IEEE 802.11a in terms of the communication distance.

IEEE 802.11n has been lately stipulated as a technique standard to overcome the limitation of the communication speed which has been admitted as a weak spot of the WLAN. IEEE 802.11n aims to increase the speed and reliability of a network and extend an operation distance of a wireless network. In detail, IEEE 802.11n supports high throughput (HT) of more than a maximum 540 Mbps as a data processing speed, and is based on a multiple input and multiple output (MIMO) technique using multiple antennas at both ends of a transmission unit and a reception unit to minimize a transmission error and optimize a data rate. Also, IEEE 802.11n standard can use orthogonal frequency division multiplex (OFDM) to increase the speed as well as using a coding scheme in which several duplicates are transmitted to enhance data reliability.

Meanwhile, a basic access mechanism of an IEEE 802.11 MAC (Medium Access Mechanism) is a CSMA/CA (Carrier Sense Multiple Access with Collision Avoidance) combined with binary exponential backoff. The CSMA/CA mechanism is also called a DCF (Distributed Coordination Function) of IEEE 802.11 MAC, basically employing a 'listen before talk' access mechanism. In this type of access mechanism, a station (STA) first listens to a radio channel or a medium before starting a transmission. Upon listening, when it is detected that the medium is not is use, the listening station starts its transmission. Meanwhile, when it is detected that the medium is in use, the station enters a delay period determined by a binary exponential backoff algorithm, rather than starting its transmission.

The CSMA/CA mechanism includes virtual carrier sensing as well as physical carrier sensing in which the station (STA) directly listens to a medium). The virtual carrier sensing is to complement the limitation of the physical carrier sensing such as a hidden node problem, or the like. For the virtual carrier sensing, IEEE 802.11 MAC uses an NAC (Network Allocation Vector). The NAV is a value for the station (STA), which currently uses the medium or has authority to use the medium, to indicate a time remaining for the medium to be available, to other stations (STA). Thus, the value set as the NAV corresponds to a period during which the medium is due to be used by the station (STA) which transmits a corresponding frame.

One of procedures for setting the NAV is a procedure of exchanging an RTS (Request To Send) frame and a CTS (Clear To Send) frame. The RTS frame and the CTS frame include information informing reception stations (STA) about an upcoming frame transmission to delay a frame transmission by the reception stations. The information may be included in a duration field of each of the RTS frame and the CTS frame. When the RTS frame and the CTS frame are exchanged, a source station (STA) transmits an actual frame desired to be transmitted to a target station (STA).

In this case, however, the CSMA/CA-based channel access method does not have high efficiency. For example, when a PHY SAP (Service Access Point) provides throughput of 1 Gbps, a MAC SAP can provide throughput of merely 50% to 60% of 1 Gbps provided by the PHY SAP.

In addition, in order to effectively use a radio channel (or a wireless channel) in the VHT system, it is required to support a MU-MIMO (Multi User Multiple Input Multiple Output) to allow several VHT STAs to simultaneously use a radio channel. In the system supporting the MU-MIMO, when a channel is accessed through a CSMA/CA, several STAs must transmit and receive an RTS frame and a CTS frame to and from an AP. Here, a scheme for avoiding collision between the RTS frames and CTS frames transmitted by the several STAs is also required.

Considerations of a contention free (CF)-based channel access method, away from a contention-based channel access method, are required to overcome the foregoing problems in the VHT wireless LAN system supporting a data transmission by the MU-MIMO.

SUMMARY OF THE INVENTION

Technical Problem

Accordingly, an aspect of the present invention is to provide a method for granting a transmission opportunity in wireless LAN system allowing a plurality of stations to simultaneously access a channel to transmit a radio frame, and a station supporting the same.

Another aspect of the present invention provides a channel access method capable of achieving throughput of 1 Gbps or greater, and a device supporting the same.

Technical Solution

According to an aspect of the present invention, there is provided a method for granting a contention-free transmission opportunity in a wireless LAN system using a combined channel comprised of a plurality of subchannels, including: transmitting a transmission opportunity granting frame granting a transmission opportunity of a plurality of target stations; and receiving a frame from each of the plurality of target stations which have acquired a transmission opportunity upon receiving the transmission opportunity granting frame.

The transmission opportunity granting frame may include A-MPDU (aggregate MAC protocol data unit), and the A-MPDU may be configured by aggregating CF-poll frames acknowledging a transmission opportunity of each of the plurality of target stations.

The transmission opportunity granting frame is a CF-poll frame acknowledging an opportunity of a specific station, and the CF-poll frame for each of the plurality of stations may be transmitted through each of the plurality of subchannels.

Different MCSs (Modulation and Coding Schemes) may be applied to the CF-poll frames transmitted through different channels among the plurality of subchannels to the plurality of stations, respectively.

The frames received from the plurality of target stations may be spatial-multiplexed by the plurality of stations and received by multiple antennas.

The frames received from the plurality of target stations may be transmitted through different subchannels by the plurality of stations.

The transmission opportunity granting frame may include a subchannel list indicating subchannels to be used for the transmission performed by each of the plurality of target stations.

The transmission opportunity granting frame may be a MP (Multichannel Polling) frame including an information element (IE) field with respect to each of the plurality of target stations, and the IE field may include a polling station identifier subfield indicating a target station of the IE field and a TXOP (transmission opportunity) limit value subfield indicating a transmission opportunity limit value acknowledged for the target station.

The IE field may further include a subchannel list subfield indicating a list of subchannels to be used by the target station to transmit the frame.

The MP frame may be broadcasted.

According to another aspect of the present invention, there is provided a contention free-based channel access method in a wireless LAN system using a combined channel comprised of a plurality of subchannels, including: receiving a transmission opportunity granting frame which acknowledges a transmission opportunity of a plurality of target stations; and when a stations is a target station of the transmission opportunity granting frame, transmitting a frame, wherein the transmission opportunity granting frame may include a polling station identifier field indicating each of the plurality of target stations and a TXOP limit value field indicating a transmission opportunity limit value acknowledged for each of the plurality of target stations, and the frame may be a spatial-multiplexed frame which is transmitted through multiple antennas in a transmission opportunity duration determined within a range of the transmission opportunity limit value acquired from the TXOP limit value field.

According to another aspect of the present invention, there is provided a station granting a contention free-based transmission opportunity in a wireless LAN system using a combined channel comprised of a plurality of subchannels, including: a transmitter; and a processor functionally connected to the transceiver, wherein the processor is set to generate a transmission opportunity granting frame including a polling station identifier field indicating each of a plurality of target stations to be acknowledged for a transmission opportunity and a TXOP limit value field indicating a transmission opportunity limit value acknowledged for each of the plurality of target stations.

Advantageous Effects

A contention free-based channel access method and a transmission opportunity granting method are provided in a wireless LAN system using a combined channel comprised of a plurality of subchannels, whereby usage efficiency of radio resources can be enhanced, and a plurality of stations can simultaneously access a channel to transmit/receive data.

MODE FOR INVENTION

Exemplary embodiments of the present invention will now be described in detail with reference to the accompanying drawings.

An embodiment described hereinafter can be usefully applied to a case in which a plurality of stations simultaneously access a channel to transmit a frame in a very high throughput (VHT) wireless LAN system operating in a 60 GHz frequency band, and an example of application to the VHT wireless LAN system is described, but the present invention is not limited thereto. A technical concept of the present invention to be described may also be applicable in the same manner to a wireless communication system in which a plurality of stations access a channel and transmit a frame irrespective of a usage frequency band.

Figure 1:
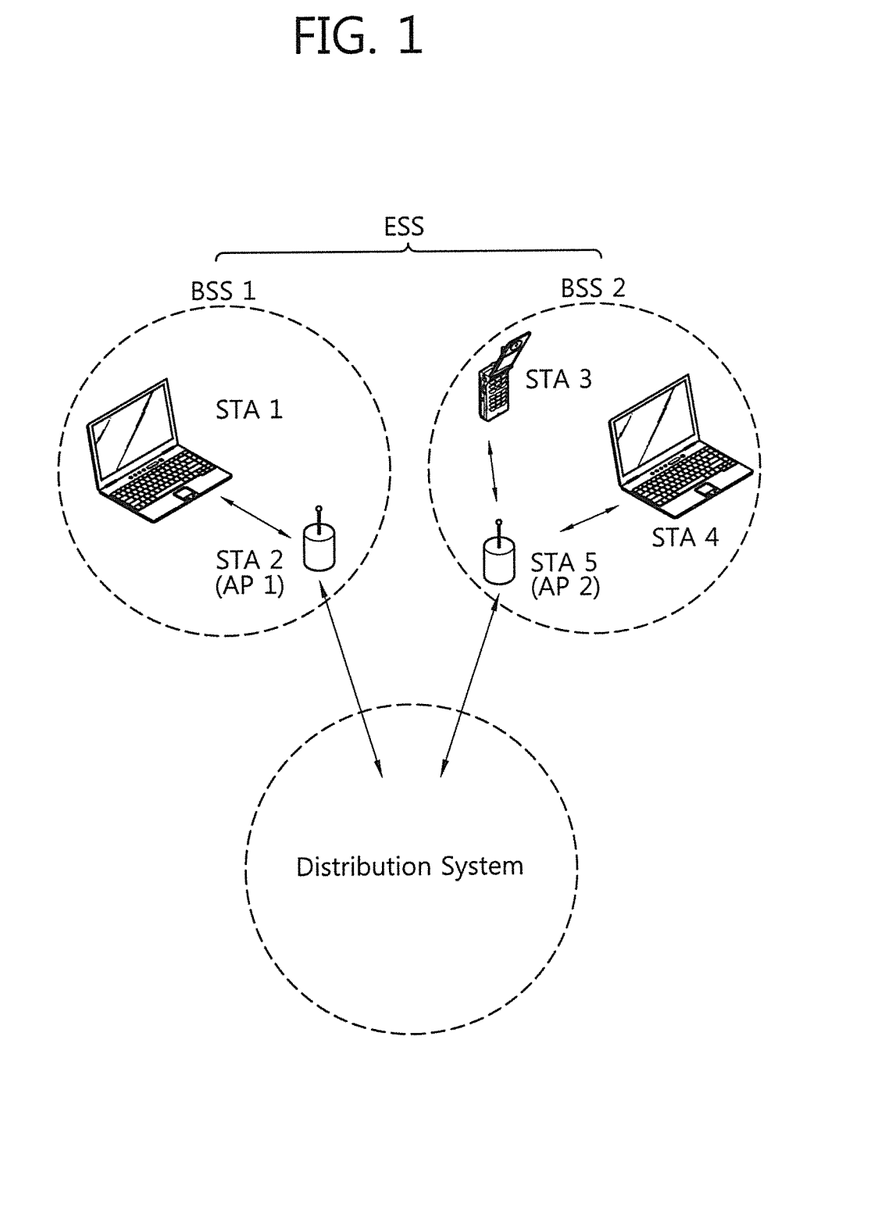
FIG. 1 is a view showing the configuration of an example of a wireless LAN system to which an embodiment of the present invention can be applicable.

FIG. 1 illustrates the configuration of a wireless local area network (WLAN) system according to an embodiment of the present invention.

With reference to FIG. 1, a WLAN system includes one or more basic service sets (BSSs). A BSS refers to a set of stations (STAs) that can communicate with each other in synchronization, rather than a concept indicating a particular area. A BSS that supports data processing at a high speed of 1 GHz or faster is called a VHT BSS.

A VHT system including one or more VHT BSSs may use a channel bandwidth of 80 MHz, but it is merely illustrative. For example, the VHT system may use a channel bandwidth of 60 MHz, 100 MHz, or wider. The VHT system has a multi-channel environment including a plurality of subchannels each having a channel bandwidth of a certain size, e.g., a channel bandwidth of 20 MHz.

The BSS may be divided into an infrastructure BSS and an independent BSS (IBSS). FIG. 1 illustrates the infrastructure BSS. The infrastructure BSS (BSS1 and BSS2) includes one or more stations (STAs) (STA1, STA3, STA4), an access point (AP) as a station (STA) providing a distribution service (DS), and a distribution system connecting a plurality of APs (AP1 and AP2). Meanwhile, the IBSS, not including an AP, includes every station (STA) as a mobile station. The IBSS establishes a self-contained network, not allowing an access to a distribution system (DS).

A station is a certain function medium including a medium access control (MAC) following the stipulation of IEEE 802.11 standard and a physical layer interface with respect to a wireless medium. A station includes both AP and non-AP stations in a broad sense. A station supporting high speed data processing of 1 GHz or faster in a multi-channel environment (to be described) is called a VHT station.

A station for radio communications may include a processor and a transceiver, and may further include a user interface, a display unit, and the like. The processor, a function unit devised to generate a frame to be transmitted via a wireless network or process a frame received via the wireless network, performs various functions to control a station. The transceiver, which is functionally connected with the processor, is configured to transmit and receive frames via the wireless network for the station.

Among the stations STAs, a mobile terminal manipulated by a user is a non-AP STA (STA1, STA3, STA4, STA4, STA6, STA7, STA8), and simply referring to a station may indicate a non-AP STA. The non-AP STA may be referred to by other names such as terminal, wireless transmit/receive unit (WTRU), user equipment (UE), mobile station (MS), mobile terminal, mobile subscriber unit, or the like. A non-AP STA supporting high speed data processing at 1 GHz or faster in a multi-channel environment (to be described) is called a non-AP VHT STA.

The APs (AP1 and AP2) are functional entities for providing an access to the DS by way of a wireless medium for an STA (Associated Station) associated thereto. In the infrastructure BSS including the APs, in principle, communications between non-AP STAs are made by way of the APs, but when a direct link has been established, the non-AP STAs can directly communicate with each other. The AP may be also called by other names such as centralized controller, base station (BS), node-B, base transceiver system (BTS), site controller, and the like, than the named of AP. In the multi-channel environment (to be described), an AP supporting high speed data processing at 1 GHz or faster is called a VHT AP.

A plurality of infrastructure BSSs may be connected via the DS. The plurality of BSSs connected via the DS is called an extended service set (ESS). STAs included in the ESS may communicate with each other, and a non-AP STA may move from one BSS to another BSS within the same ESS while seamlessly performing communication.

The DS is a mechanism allowing one AP to communicate with another AP. Through the DS, an AP may transmit a frame for STAs associated to the BSS managed by the AP, transfer a frame when one STA moves to another BSS, or transmit or receive frames to and from an external network such as a wireline network. The DS may not be necessarily a network. Namely, the DS is not limited to any form so long as it can provide a certain distribution service stipulated in IEEE 802.11 standard. For example, the DS may be a wireless network such as a mesh network or a physical structure connecting the APs.

Figure 2:
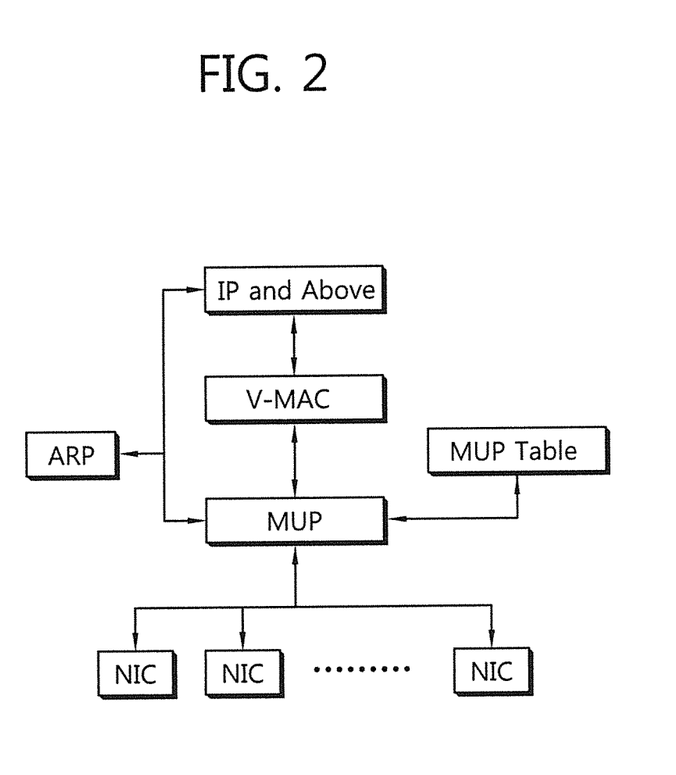
FIG. 2 is a block diagram of a multi-radio integrated protocol, an example of a protocol applicable to a wireless LAN system having a plurality of network interface cards (NICs) each having an independent radio interface.

FIG. 2 illustrates a schematic block diagram of a multi-radio unification protocol (MUP), an example of a protocol applicable to a VHT system including a plurality of network interface cards (NICs) each having an independent radio interface.

With reference to FIG. 2, a station (STA) supporting the MUP includes a plurality of network interface cards (NICs). In FIG. 2, the respective NICs are illustrated to be separated, which means that MAC/PHY modules in the respective NICs are independently operated. Namely, the NICs discriminately illustrated in FIG. 2 are logical entities operating according to an individual MAC/PNY protocol. Thus, the plurality of NICs can be implemented as function entities which are physically differentiated or may be integrated into a single physical entity so as to be implemented.

According to an aspect of the present invention, the plurality of NICs may be classified into a primary radio interface and one or more secondary radio interfaces. The plurality of secondary radio interfaces may be classified into first, second, third secondary radio interfaces, or the like. The classification of the primary and secondary radio interfaces and/or the classification of the secondary radio interfaces may be policy-oriented or may be adaptively determined in consideration of a channel environment.

The plurality of NICs are integrally or collectively managed through the MUP. As a result, the NICs are recognized as if it is a single unit to the exterior. For this operation, the VHT system includes a virtual-medium access control (V-MAC), and through the V-MAC, an upper layer cannot recognize that is it operated by the plurality of NICs in a multi-radio channel In this manner, in the VHT system, the upper layer cannot recognize the multi-radio through the V-MAC. Namely, a virtual Ethernet address is provided.

A channel access procedure in the WLAN system according to embodiments of the present invention will now be described. The exemplary embodiments (to be described) relates to a WLAN system using a combined channel in which four contiguous subchannels each having a channel bandwidth of 20 MHz are combined (namely, a combined channel using a channel bandwidth of 80 MHz), but they are merely illustrative. Namely, it will be obvious to a person having ordinary skill in the art that the embodiments of the present invention may also be applicable in the same manner to a WLAN system including a plurality of subchannels, e.g., two, three or five or more subchannels. Also, a case in which the bandwidth of subchannels is 20 MHz is assumed to be described, but this is merely illustrative and the bandwidth of the subchannels may be increased or decreased as necessary.

In an embodiment (to be described), it is assumed that a station (STA) operates in a contention-free period (CFP). The CFP may be repeated alternately with a contention period (CP) or the CFP may continue. A CF service provided during the CFP may be provided by a PCF (Point Coordination Function) or an HCF (hybrid coordination function). A PC (point coordinator) or an HC (Hybrid coordinator) serving as a coordinator such as acknowledging a transmission opportunity (TXOP) for a station STA, or the like, may separately exist or an AP may play the role. During the CFP, the AP serving as a PC or an HC coordinates channel accessing of each station STA.

According to an embodiment of the present invention, when an AP controls channel accessing of associated stations STAs, it transmits a transmission opportunity granting frame to a specific STA in order to acknowledge a transmission opportunity to the specific STA. Transmitting, by the AP, a transmission opportunity granting frame to the STA and acknowledging a transmission opportunity is called polling of the STA. A transmission opportunity acknowledged through polling is called polled TXOP, discriminated from the transmission opportunity (EDCA TXOP) acquired through an EDCA (enhanced distributed channel access) scheme. TXOP used hereinafter will mean a transmission opportunity acknowledged by the polling of the AP unless otherwise mentioned. Upon receiving the transmission opportunity granting frame, the STA may acquire a transmission opportunity and perform an uplink transmission to the AP during a pre-set period within a transmission opportunity limit.

According to an embodiment of the present invention, the AP simultaneously polls a plurality of STAs to allow the plurality of STAs to simultaneously have the TXOP. Upon acquireing the TXOP, the plurality of STAs may simultaneously transmit a frame to the AP according to an SDMA (spatial division multiple access) scheme or an FDMA (frequency division multiple access) scheme during the TXOP duration. At this time, channel accessing by the STAs may be performed by subchannels, and this is to enhance channel utilization efficiency.

As for the transmission opportunity granting frame according to an embodiment of the present invention, CF-poll frames of the IEEE 802.11e standard may be aggregated to be used as the transmission opportunity granting frame. Here, the CF-poll frame is a frame transmitted by the AP to the STA to acknowledge the TXOP of the STA during the CFP.

The CF-poll frame may have a form of Data+CF-Poll, Data+CF-Ack+CF-poll, CF-Poll (no data), CF-Ack+CF-poll (no data), Qos Data+CF-Poll, Qos Data+CF-Ack+CF-poll, Qos CF-Poll (no data), Qos CF-Ack+CF-poll (no data), and these types may be determined according to a pre-set value of a type subfield and a subtype subfield of a frame control field of a MAC frame.

TABLE 1

| Type value b3 b2 | Type description | Subtype value b7 b6 b5 b4 | Subtype description |
| --- | --- | --- | --- |
| 10 | Data | 0000 | Data |
| 10 | Data | 0001 | Data + CF-Ack |
| 10 | Data | 0010 | Data + CF-Poll |
| 10 | Data | 0011 | Data + CF-Ack + CF-Poll |
| 10 | Data | 0100 | Null (no data) |
| 10 | Data | 0101 | CF-Ack (no data) |
| 10 | Data | 0110 | CF-Poll (no data) |
| 10 | Data | 0111 | CF-Ack + CF-Poll (no data) |
| 10 | Data | 1000 | QoS Data |
| 10 | Data | 1001 | QoS Data + CF-Ack |
| 10 | Data | 1010 | QoS Data + CF-Poll |
| 10 | Data | 1011 | QoS Data + CF-Ack + CF-Poll |
| 10 | Data | 1100 | QoS Null (no data) |
| 10 | Data | 1101 | Reserved |
| 10 | Data | 1110 | QoS CF-Poll (no data) |
| 10 | Data | 1111 | QoS CF-Ack + CF-Poll (no data) |
| 11 | Reserved | 0000-1111 | Reserved |

Table 1 shows a detailed example of the type subfield and subtype subfield values of a MAC frame. In Table 1, b3, b2 indicates a value of the type subfield, and b7, b6, b5, b4 indicates a value of the subtype subfield. When the type subfield value (b3, b2) of a frame control field of a certain MAC frame is 10, it indicates that a corresponding frame is a data frame, and when the value (b7 b6 b5 b4) of the subtype subfield is 0110, it indicates that a corresponding frame is a data frame having only a CF-poll without a data or CF-Ack. When the type subfield value is 10 and a bit 5 (b5) of the subtype subfield is set to 1, a CF-poll is included. A frame including the CF-poll will be generally called a CF-poll in describing an embodiment of the present invention hereinafter.

Details of the CF-poll frame may be referred to IEEE Std 802.11™-2007 (Revision of IEEE STd 802.11-1999) "IEEE Standard for Information technology-Telecommunications and information exchange between systems-Local and metropolitan area networks-Specific requirements, Part 11: Wireless LAN Medium Access Control (MAC) and Physical Layer (PHY) Specifications".

According to an embodiment of the present invention, the AP aggregates CF-poll frames to be transmitted to an STA as a subject of polling and transmits the aggregated CF-poll frame. When the AP polls STA 1, STA 2, STA 3, and STA 4, the AP may aggregate four CF-poll frames into one frame and transmit the one aggregated frame.

Figure 3:
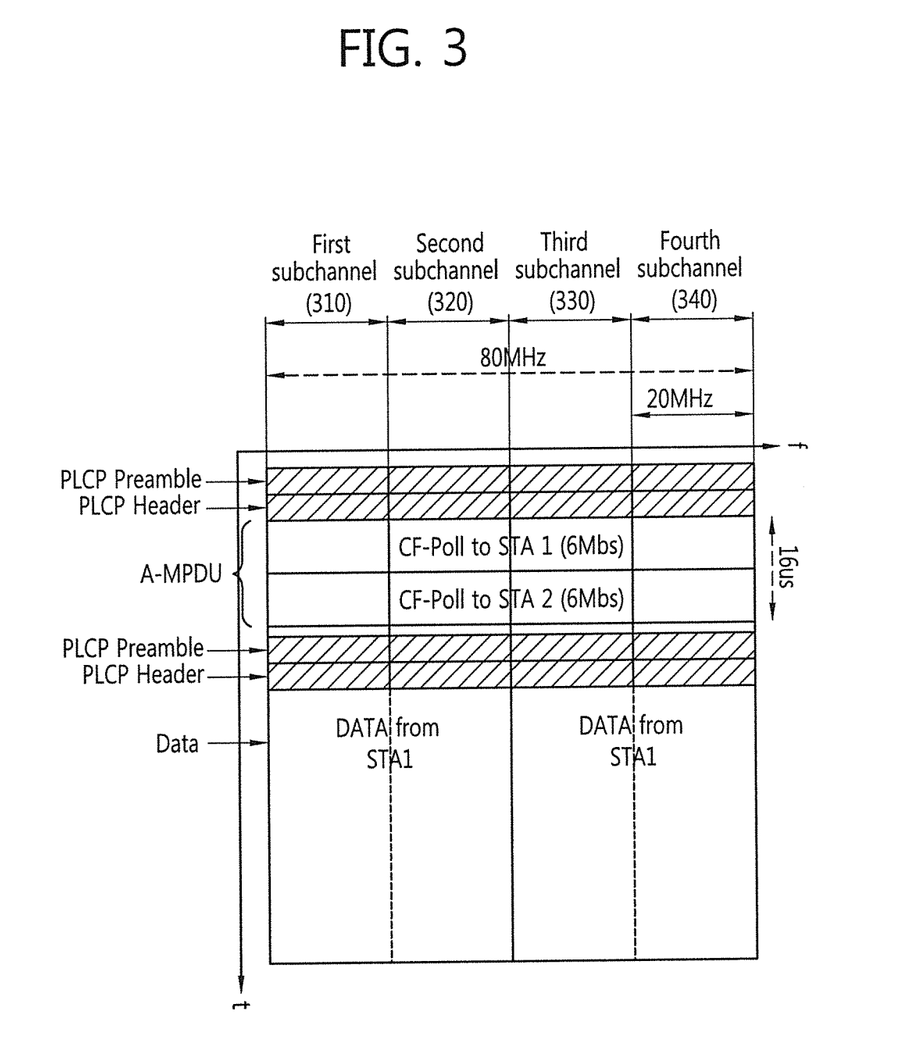
FIG. 3 is a view showing a channel access method according to an embodiment of the present invention.

FIG. 3 is a view showing a channel access method according to an embodiment of the present invention.

In the example of FIG. 3, in order to poll STA1 and STA2, the AP transmits a CF-Poll frame with respect to the STA 1 and a CF-Poll frame with respect to the STA 2. Here, the AP may aggregate the CF-Poll frames with respect to the STA 1 and the CF-Poll frame with respect to the STA 2 into a form of A-MPDU (aggregation MPDU) and transmit the same. Since the CF-Poll frames are aggregated and transmitted, a PLCP preamble and a PLCP header otherwise added can be reduced, compared with a case in which the CF-Poll frames are separately transmitted, reducing overhead. In the case in which the CF-Poll frames are aggregated into the form of A-MPDU and transmitted to the plurality of STAs, an MCS (Modulation and Coding Scheme) is set to allow all the STAs to receive the A-MPDU. Upon receiving the A-MPDU, the STAs parse each MPDU included in the A-MPDU to identify a frame type and a target STA of the corresponding MPDU.

The STA1 and STA2 may parse the MPDU included in the received A-MPDU to identify that a frame type is the CF-Poll frame and a target STA is the STA1 itself or the STA2 itself. The STA1 and the STA2 may recognize that the TXOP has been acknowledged for them and transmit a frame to be transmitted to the AP during the corresponding TXOP duration.

As described above, as for a frame transmission to the AP, the plurality of STAs may transmit frames according to an SDMA scheme by using multiple antennas or the plurality of STAs may transmit the frames according to an FDMA scheme by using different transmission frequency bands. FIG. 3 shows an example of a case in which frames are transmitted according to the FDMA scheme. As shown in FIG. 3, when the plurality of STAs acknowledge for the TXOP transmit frames to the AP according to the FDMA scheme, the CF-Poll frame with respect to each of the STAs may further include a subchannel list, information indicating subchannels to be used for a frame transmission by the target STAs during the TXOP duration, in addition to the information indicating the target STAs and the information regarding TXOP duration.

In the example of FIG. 3, the AP designates first and second subchannels in the subchannel list included in the CF-Poll frame with respect to the STA 1 and designates third and fourth subchannels in the subchannel list included in the CF-Poll frame with respect to the STA 2, and transmits them. The STA 1 transmits a data frame to the AP through the first and second subchannels designated in the subchannel list included in the CF-Poll frame and the STA 2 transmits a data frame to the AP through the third and fourth subchannels designated in the subchannel list included in the CF-Poll frame. The frame transmission to the AP may be made several times in the acknowledged TXOP duration.

Figure 4:
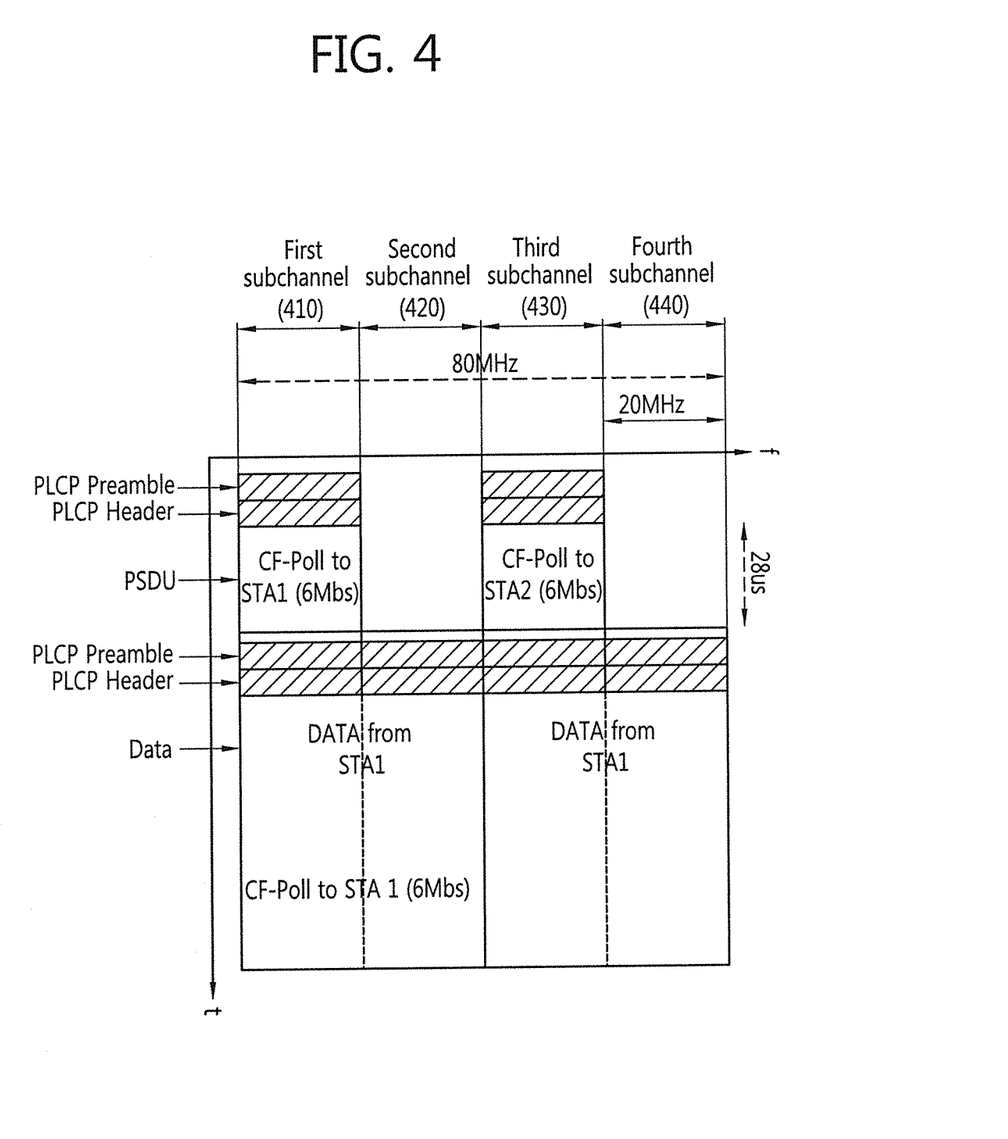
FIG. 4 is a view showing a channel access method according to another embodiment of the present invention.

FIG. 4 is a view showing a channel access method according to another embodiment of the present invention.

The AP transmits the CF-Poll frame with respect to the STA 1 and the CF-Poll frame with respect to the STA 2 through different subchannels. Accordingly, different MCSs may be selected for each of the subchannels. Upon receiving the CF-Poll frames acknowledging a transmission opportunity of the STA 1 and STA 2 through the different subchannels, the STA 1 and STA 2 may transmit frames according to the SDMA scheme by using multiple antennas or may transmit frames at different transmission frequency bands according to the FDMA scheme. FIG. 4 shows an example of a case in which the frames are transmitted according to the FDMA scheme.

Similar to the example of FIG. 3, the CF-Poll frame includes information indicating a target STA and information regarding a TXOP duration, and when a frame transmission is made according to the FDMA scheme, a subchannel list, information indicating subchannels to be used by the target STA to transmit a frame during the TXOP duration, may be further included.

Like the example of FIG. 3, when the STA receives the CF-Poll frame transmitted through each subchannel, the STA acquires the information indicating the target STA and the information indicating the TXOP duration included in the CF-Poll frame. The STA, which has acquired the TXOP as the target STA of the CF-Poll frame, transmits a frame to the AP according to the SDMA or the FDMA scheme in the TXOP duration. In this case, when the frame is transmitted according to the FDMA scheme, the frame is transmitted to the AP through subchannels indicated by the subchannel list included in the CF-Poll frame.

In the examples of FIGS. 3 and 4, in order to poll a plurality of STAs, the AP aggregates the CF-Poll frames of the IEEE 802.11 standard into the form of A-MPDU and transmits the A-MPDU, or transmits the CF-Poll frames through different specific subchannels. In addition, in a different embodiment of the present invention, a new transmission opportunity granting frame for polling a plurality of STAs is proposed. Hereinafter, the new transmission opportunity granting frame for polling a plurality of STAs will be referred to as a multi-channel polling (MP) frame.

Figure 5:
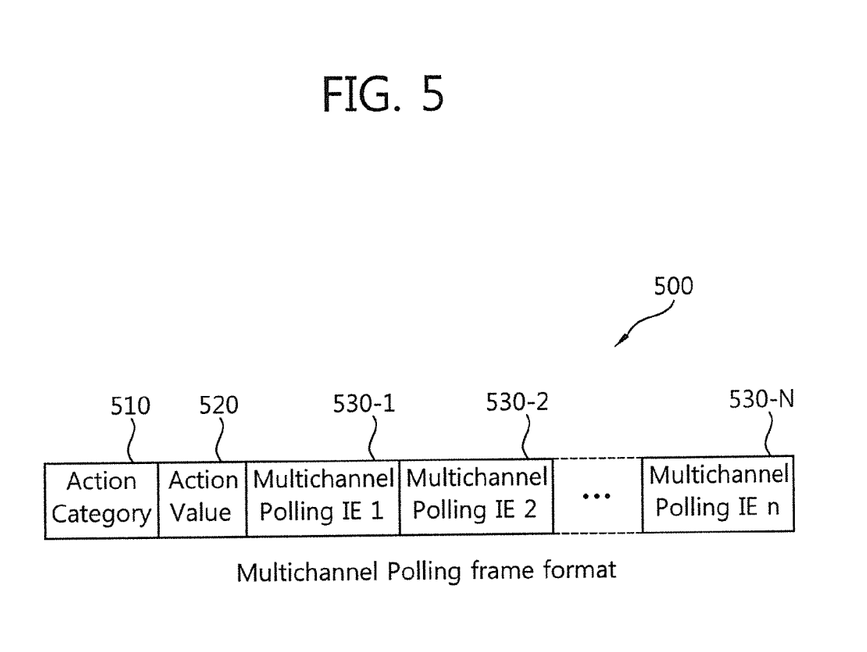
FIG. 5 is a block diagram showing an example of the format of an MP frame according to an embodiment of the present invention.

FIG. 5 is a block diagram showing an example of the format of an MP frame according to an embodiment of the present invention.

An MP frame 500 includes n number of multi-channel polling (MP) information element (IE) fields 530-1, . . . , 530-N. Here, n may be the number of target STAs to be polled. The MP frame 500 may further include an action category 510, an action value field 520, and the like, in addition to the n number of MPIE fields. The action category field 510 and the action value field 520 briefly represent a category and operation content of a corresponding frame. Namely, The action category field 510 and the action value field 520 may indicate that a corresponding frame is related to polling of a STA and is an administration signal therefor.

Each of the MPIE may include required information such as information indicating a station polling target STA, a TXOP limit value allocated to a target STA, information regarding a subchannel list of subchannels which can be used by the target STA for a frame transmission in the TXOP duration, a frame identifier, information regarding length information of a frame, and the like.

Figure 6:
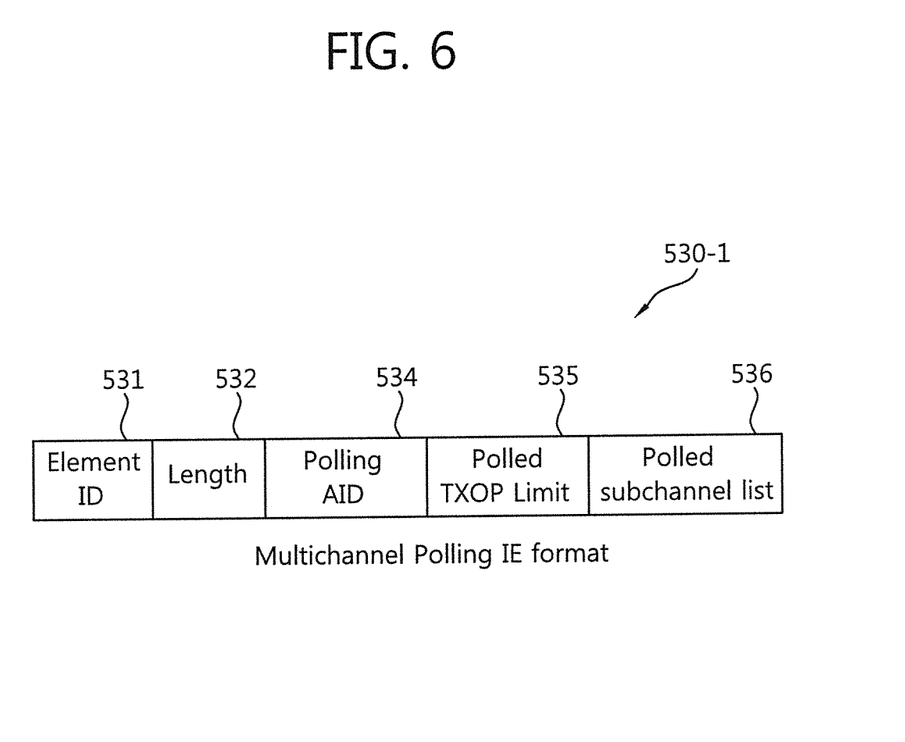
FIG. 6 is a block diagram showing a specific example of an MP IE format of FIG. 5.

FIG. 6 is a block diagram showing a specific example of the MP IE format of FIG. 5.

In FIG. 6, a polling association identifier (AID) field 534 includes information indicating a target STA, and a polled TXOP limit field 535 includes a TXOP limit value allocated to the target STA. The polling AID field 534 in FIG. 6, which is an example of an identifier subfield for specifying the target STA, may be set in the form of various subfields including information for identifying the target STA such as a MAC address, or the like, of the STA, besides the AID of the STA, and transmitted. A polled subchannel list 536 includes information indicating a list of subchannels which can be used by the target STA in the TXOP duration. Namely, the polled subchannel list 536 is to inform about subchannels to be used by each of a plurality of target STAs when the target STAs transmit a frame to an AP according to the FDMA scheme. Thus, when the plurality of target STAs transmit a frame to the AP according to the SDMA scheme, the polled subchannel list field 536 may be omitted.

In an embodiment of the present invention, channel accessing of an STA using a MP frame is performed through the following process. An AP broadcasts the MP frame 500. Each station, which has received the MP frame 500, determines whether or not it is a target STA through the polling AID field 534 of the MPIE field. When a station corresponds to a target STA acknowledged for TXOP, the station sets a TXOP duration from the polled TXOP limit field and transmits a frame to the AP in the TXOP duration. Here, a frame transmission may be performed according to the SDMA or the FDMA scheme. When a frame transmission is performed according to the FDMA scheme, the STA may check a subchannel to be used for its frame transmission from the polled subchannel list field 536 and transmits a frame via the corresponding subchannel.

Figure 7:
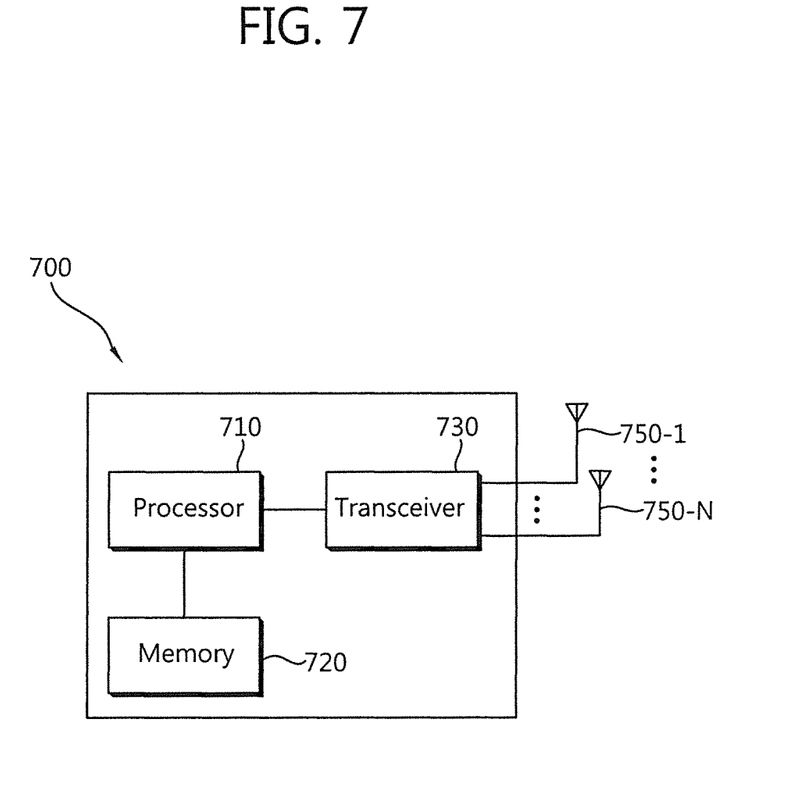
FIG. 7 is a block diagram of a wireless device implementing an embodiment of the present invention.

FIG. 7 is a block diagram of a wireless device implementing an embodiment of the present invention. A wireless device 700 may be an AP or a non-AP STA.

The wireless device 700 may include a processor 710, a memory 720, a transceiver 730, and multiple antennas 750-1, ..., 750-N. The transceiver 730 may have a plurality of network interface cards (NICs), and may transmit/receive a frame according to the MU-MIMO scheme through multiple antennas 750-1, ..., 750-N. The processor 710, which is connected to the transceiver 730, generates a frame. The processor 710 and the transceiver 730 implement a physical layer and a MAC layer of IEEE 802.11. The processor 710 and/or the transceiver 730 may include an ASIC (application-specific integrated circuit), another chip set, a logical circuit and/or a data processing device. The memory 720 may include a ROM (read-only memory), a RAM (random access memory), a flash memory, a memory card, a storage medium, and/or any other storage device. When the embodiments are implemented by software, the foregoing schemes may be implemented by modules (processes, functions, or the like) performing the foregoing functions. The modules may be stored in the memory 720 and executed by the processor 710. The memory 720 may be provided within or outside the processor 710, or may be connected to the processor 710 by means of a well-known unit.

The preferred embodiments of the present invention have been described with reference to the accompanying drawings, and it will be apparent to those skilled in the art that various modifications and variations can be made in the present invention without departing from the scope of the invention. Thus, it is intended that any future modifications of the embodiments of the present invention will come within the scope of the appended claims and their equivalents.

What is claimed is:

1. A method for transmitting data in a wireless local area network, the method comprising:

receiving, by a transmitting station, a transmission opportunity (TXOP) granting frame from an access point (AP), the TXOP granting frame for granting a TXOP to a plurality of target stations, wherein the TXOP granting frame includes identification information, duration information, and subchannel information, the identification information indicating the plurality of target stations, the duration information indicating a duration of the granted TXOP, the subchannel information indicating a plurality of subchannels; and if it is determined that the transmitting station belongs to one of the plurality of target stations, transmitting, by the transmitting station, a data frame to the AP during the duration of the granted TXOP via at least one of the plurality of subchannels.

2. The method of claim 1, wherein the TXOP granting frame is transmitted as an aggregate Medium Access Control (MAC) protocol data unit (A-MPDU).

3. A device for a wireless local area network, the device comprising:

a transceiver configured to receive and transmit radio signals; and a processor operatively coupled with the transceiver and configured to:

control the transceiver to receive a transmission opportunity (TXOP) granting frame from an access point (AP), the TXOP granting frame for granting a TXOP to a plurality of target stations, wherein the TXOP granting frame includes identification information, duration information, and subchannel information, the identification information indicating the plurality of target stations, the duration information indicating a duration of the granted TXOP, the subchannel information indicating a plurality of subchannels; and if it is determined that the device belongs to one of the plurality of target stations, control the transceiver to transmit a data frame to the AP during the duration of the granted TXOP via at least one of the plurality of subchannels.

* * * * *